Patented July 10, 1951

2,559,668

UNITED STATES PATENT OFFICE 2,559,668

AZO ANTHRAQUINONE VAT DYES AND INTERMEDIATES

Herman E. Schroeder, Wilmington, Del., and Joseph Deinet, Glassboro, N. J., assignors to E. I. du Pont de Nemours & Company, Wilmington, Del., a corporation of Delaware No Drawing. Application June 17, 1949, Serial No. 99,872

6 Claims. (Cl. 260—157)

This invention relates to anthraquinone vat dyes and intermediates, and more particularly to monoanthraquinone oxazoles and thiazoles of azobiphenyldicarboxylic acid.

It has been recognized for many years that, in the dyes of the anthraquinone series, those in the yellow range are generally deficient in their fastness properties, more particularly with regard to fastness to light, although in general the dyes of the anthraquinone vat dye class are considered to have good fastness properties. Where yellow dyes have been found in the anthraquinone series which have good fastness properties, they are usually either dull or weak tinctorially, and therefore the various dyes in the anthraquinone vat dye class must be selected to answer the particular need at hand, balancing the question of fastness, brightness and tinctorial strength of the particular dyes available. In U. S. Patent 2,175,803 a group of symmetrical dianthraquinonediazoles, more particularly imidazoles, 1,2 (N)-thiazoles and 2,1(N)-oxazoles which contain an azo group, are disclosed. These compounds dye vegetable fibers in yellowish shades and are said to exhibit good fastness to chlorine and boiling soap solution, and, in many cases, to light. It has been found, however, that these dyes are deficient in wet fastness, particularly in kier boiling, and in their vat stability. In U. S. Patent 2,228,455 a series of dianthraquinonylimides containing azo groups are disclosed which have relatively good fastness properties, but these dyes have been found to be dull and considerably weaker than the azole types of the first mentioned patent.

It is an object of this invention to prepare new anthraquinone oxazoles and thiazoles of azobiphenyldicarboxylic acid which are valuable as dyes, pigments and intermediates for the preparation of other dyes. It is a further object of the invention to prepare new and valuable yellow dyes of the anthraquinone series which dye cellulose fibers from the usual alkaline hydrosulfite vats in strong shades which have outstanding fastness properties.

We have found that, where the azobiphenylcarbonylaminoanthraquinone compounds of the formula:

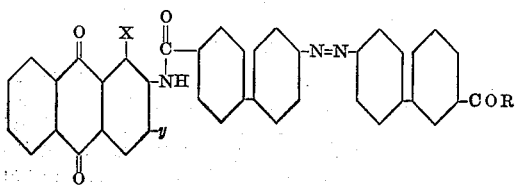

in which X stands for a substituent of the group consisting of —Cl, —Br and —SH, y stands for an element of the group consisting of H, Cl and Br and R stands for a radical of the group consisting of —OH, —Cl, —O-alkyl, —NH₂, —NH-alkyl, and —NH-aryl in which the O-alkyl group may carry from 1 to 18 carbon atoms, the —NH-alkyl group from 1 to 4 carbon atoms and the aryl group is a hydrocarbon radical of the benzene and naphthalene series, are ring closed to form the oxazole or thiazole ring, new compounds are obtained which are of value as dyes, pigments and intermediates for other dyes, which have the formula:

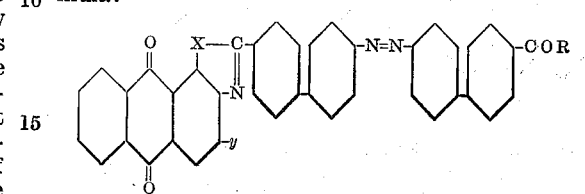

in which X stands for an element of the group consisting of O and S and y and R have the same significance as given above.

These simple carboxylic acid compounds possess exceptional and unexpected merit as light-fast pigments and vat dyes. Very surprisingly, only a single anthraquinone nucleus is sufficient to confer vattability on a group of products with molecular weights over 500.

The compounds of this invention are formed by the condensation of equal molecular ratios of 4,4'-azobiphenyl-4'',4'''-dicarbonyl chloride with a 1-halogen-2-aminoanthraquinone with further conversion of the remaining free acid chloride group to the free acid, the acid amide, the alkyl ether or the aryl- or alkyl-amide derivative where such compounds are to be produced, followed by ring closure to the oxazole. A number of the intermediates useful for producing compounds of the present invention are disclosed and claimed in our co-pending application Serial No. 99,871.

Alternatively, 1-mercapto-2-aminoanthraquinone can be used instead of the halogen derivative, thus giving rise to a thiazole instead of an oxazole. Bright, strong yellow products are formed. They are filtered off, purified if desired by known means such as by acid pasting or alkaline hypochlorite bleaching, and converted into pastes or powders for various applications as dyes or pigments. If desired, certain of the oxazole products, and particularly the free carboxylic acid, can be converted to the acid halide and subjected to condensation with vattable amines to give further dyes of the type disclosed in co-pending applications Serial Nos. 99,873, 99,877, 99,878 and 99,880.

The following examples are given to illustrate the invention. The parts used are by weight, unless otherwise specified.

*Example 1*

Sixty (60) parts of 4,4'-azobiphenyl-4'',4'''-dicarboxylic acid (sodium salt) are suspended in 1200 parts of nitrobenzene, 1.5 parts of pyridine and 50 parts of thionyl chloride are added while agitating, and the mass is heated to 95° C. and maintained for 12 hours. It is then air-blown for one-half hour (to take out excess of thionyl chloride) and cooled to 50° C., when 33 parts of 1-chloro-2-aminoanthraquinone are added. The mass is heated to 135°–138° C. and maintained for 6 hours. It is cooled to 120° C., 25 parts of water are added (slowly) and the mass is heated to 125°–130° C. and maintained for 6 hours. It is cooled to 100° C., 50 parts of sodium carbonate, 50 parts of potassium acetate, 1.5 parts of cupric acetate and 1.5 parts of cuprous chloride are added; the mass is heated to 210° C., and maintained for 6 hours. After cooling, the mass is filtered, the cake washed with nitrobenzene, alcohol and hot water in turn, and dried. It is obtained in good yields and has the following formula:

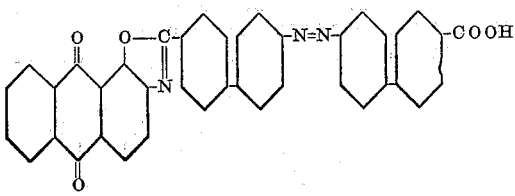

It is a yellow solid, gives a red-brown sodium hydrosulfite vat (violet cast) and dyes and prints cotton in bright yellow shades of very good fastness properties.

Example 2

Forty (40) parts of product as obtained in Example 1 are suspended in 400 parts of nitrobenzene and 1 part of pyridine. While agitating, 15 parts of thionyl chloride are added, the mass is heated to 138°–140° C. and maintained for 12 hours. It is cooled to 25° C., filtered, washed with benzene and dried. It is obtained in very good yield and quality, analyzing 5.6% chlorine, and has the following formula:

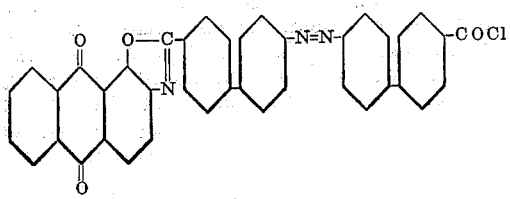

It is a yellow solid and it is easily decomposed by concentrated sulfuric acid to the free acid (COOH).

Example 3

Forty (40) parts of 1-chloro-2-aminoanthraquinone, 77 parts of 4,4'-azobiphenyl-4'',4'''-dicarboxylic acid chloride and 1500 parts of nitrobenzene and 0.5 part of pyridine are heated together to 140° C. and maintained for 6 hours. It is then cooled to 125° C. and treated with ammonia (by leading a weak stream of $NH_3$ into the reaction mass) for 3 to 4 hours. Then 50 parts of sodium carbonate, 50 parts of potassium acetate, 1.5 parts of cupric acetate and 1.5 parts of cuprous chloride are added, the mass is heated to 210° C. and maintained for 6 hours. After cooling the mass is filtered, the cake washed with alcohol and hot water, in turn, and dried. It is obtained in good yields and has the following formula:

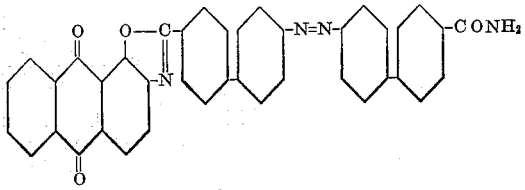

It is a yellow solid, gives a red-brown sodium hydrosulfite vat (violet cast) and dyes cotton in bright yellow shades of very good fastness properties.

Example 4

Thirty-three (33) parts of 1-chloro-2-aminoanthraquinone, 60 parts of 4,4'-azobiphenyl-4'',4'''-dicarboxylic acid chloride, 0.5 part of pyridine and 1200 parts of nitrobenzene are heated together to 138°–140° C. and maintained for 6 hours. Then 25 parts of methyl alcohol are slowly added at 125°–135° C. and maintained for 3 hours. Then 50 parts of sodium carbonate, 50 parts of potassium acetate, 1.5 parts cupric acetate and 1.5 parts of cuprous chloride are added, the mass is heated to 210° C. and maintained for 6 hours. After cooling the mass is filtered, washed with alcohol and water, in turn, and dried. The product obtained has the following formula:

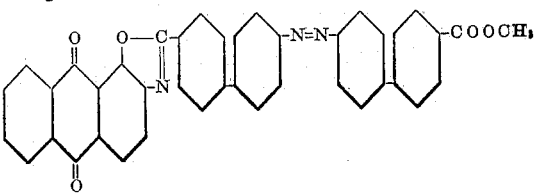

It is a yellow solid, gives a red-brown sodium hydrosulfite vat (violet cast) and dyes and prints in bright yellow shades of good fastness properties.

By replacing the methyl alcohol with 25 parts of dodecyl alcohol, a product of the following formula is obtained:

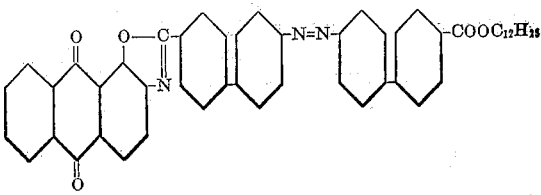

It is a yellow solid and dyes cotton from a red-brown sodium hydrosulfite vat in bright yellow shades.

If in the above example other aliphatic alcohols of the series containing from 1 to 18 carbon atoms are substituted for the methyl alcohol, such as the ethyl, isopropyl, butyl, octyl, cetyl and octadecyl, or other primary or secondary alcohols containing up to 18 carbon atoms, compounds are obtained which dye cellulose fibers from the usual alkaline hydrosulfite vats in bright yellow shades.

Example 5

Twenty (20) parts of the sodium salt of 1-mercapto-2-aminoanthraquinone are suspended in 400 parts of nitrobenzene and 0.5 part of pyridine. While agitating, 33.2 parts of 4,4'-azobiphenyl-4'',4'''-dicarboxylic acid chloride are added. The mass is heated to 135°–138° C. and maintained for 6 hours, then heated to 145°–148° C. and maintained for 6 hours. It is cooled to 50° C., filtered, washed with benzene and dried.

It is obtained in very good yields and has the following formula:

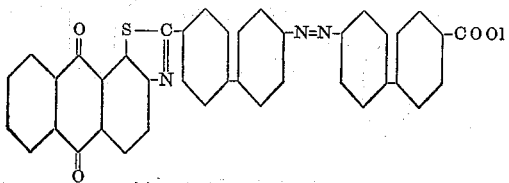

Upon treatment with concentrated sulfuric acid, the free acid compound of the following formula is obtained.

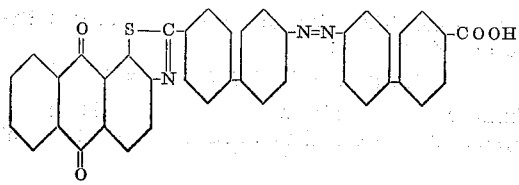

It dyes and prints cotton from a dull violet sodium hydrosulfite vat in bright yellow shades of very good strength and fastness properties.

Example 6

Sixty (60) parts of 4,4'-azobiphenyl-4'',4'''-dicarboxylic acid (sodium salt) are suspended in 1200 parts of nitrobenzene, 1.5 parts of pyridine and 50 parts of thionyl chloride are added while agitating, and the mass is heated to 95° C. and maintained for 12 hours. It is then air blown for one-half hour to take out excess of thionyl chloride, and cooled to 50° C., when 43.3 parts of 1-bromo-2-amino-3-chloroanthraquinone are added. The mass is heated to 148° C. and maintained for 12 hours. It is cooled to 120° C., 25 parts of water are added (slowly) and the mass is heated to 120°–125° C. and maintained for 6 hours. It is cooled to 100° C. Fifty parts of sodium carbonate, 50 parts of potassium acetate, 1.5 parts of cupric acetate and 1.5 parts of cuprous chloride are added. The mass is heated to 210° C. and maintained for 6 hours. After cooling, the mass is filtered, the cake washed with nitrobenzene, alcohol and hot water in turn, and dried. It is obtained in good yields and has the following formula:

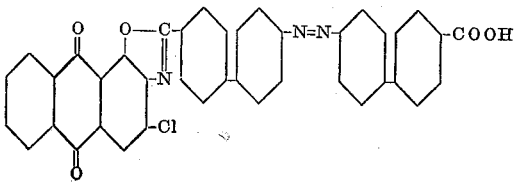

It is a yellow solid, gives a dull violet sodium hydrosulfite vat (red-brown) and dyes and prints cotton in bright yellow shades of very good fastness properties.

Example 7

A mixture of 1200 parts of nitrobenzene, 0.2 part of pyridine, 100 parts of the following acid chloride:

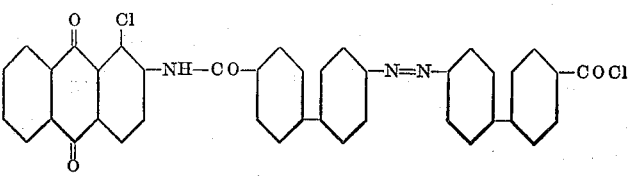

(obtained by condensing 1-chloro-2-aminoanthraquinone with 4,4'-azobiphenyl-4'',4'''-dicarboxylic acid chloride mol per mol) and 14 parts of aniline was heated together to 210° C. and maintained for one hour. It is cooled to 100° C., when 50 parts of sodium carbonate, 50 parts of potassium acetate, 1.5 parts of cupric acetate and 1.5 parts of cuprous chloride were added; then the reaction mass was heated to 210° C. and maintained for 6 hours. After cooling, the mass was filtered, the cake was washed with alcohol and hot water in turn, and dried.

It is obtained in good yield and has the following formula:

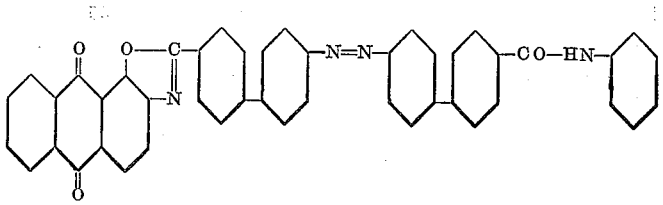

It is a yellow solid and dyes cotton in bright yellow shades of very good fastness properties from a sodium hydrosulfite vat.

Besides ammonia an aniline, other amines such as methyl, ethyl, isopropyl, the butyl amines and alpha- or beta-naphthylamine can be used in condensation with the acid chlorides. In place of nitrobenzene, other high boiling solvents such as nitrotoluenes, di- and trichlorobenzene, naphthalene, alpha-chloronaphthalene, diphenyl ether, etc., can be used as solvents. Phosphorus pentachloride can be employed as acid chloride forming agent instead of thionyl chloride, while as ring closing agents sodium or potassium carbonates, either alone or in conjunction with anhydrous sodium or potassium acetate, formate, etc., can be used in admixture with any desired copper salt or copper oxide. In forming the thiazole ring, the use of these alkaline agents and catalysts is not necessary when working with the alkali metal salt of the ortho-mercaptoaminoanthraquinone.

We claim:
1. The compounds of the general formula:

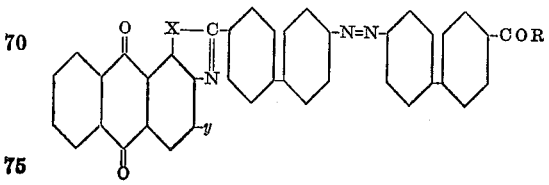

in which X stands for an element of the group consisting of O and S, y stands for an element of the group consisting of H, Cl and Br, and R stands for a radical of the group consisting of —OH, —Cl, —O-alkyl, —NH₂, —NH-alkyl and —NH-aryl in which the O-alkyl group carries from 1 to 18 carbon atoms, the —NH-alkyl group from 1 to 4 carbon atoms and the aryl group is a hydrocarbon radical of the benzene and naphthalene series.

2. The compound of the formula:

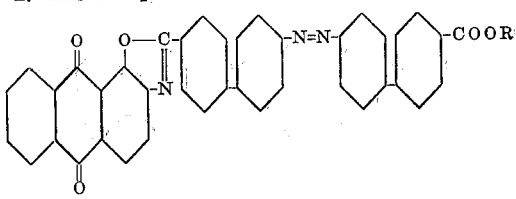

3. The compound of the formula:

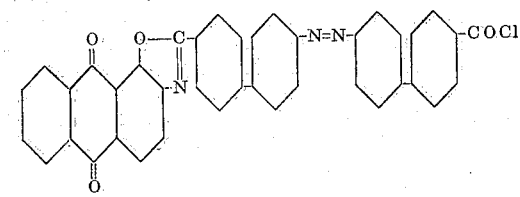

4. The compound of the formula:

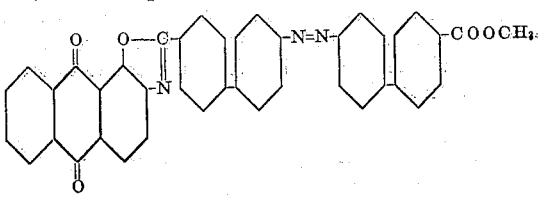

5. The compound of the formula:

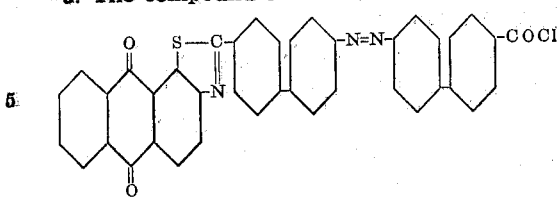

6. The compound of the formula:

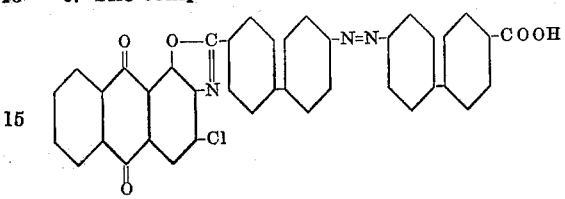

HERMAN E. SCHROEDER.
JOSEPH DEINET.

REFERENCES CITED

The following references are of record in the file of this patent:

UNITED STATES PATENTS

| Number | Name | Date |
|---|---|---|
| 2,175,803 | Honold et al. | Oct. 10, 1939 |

Certificate of Correction

July 10, 1951

Patent No. 2,559,668

HERMAN E. SCHROEDER ET AL.

It is hereby certified that error appears in the printed specification of the above numbered patent requiring correction as follows:

Column 1, lines 49 to 54, right-hand portion of the formula, for

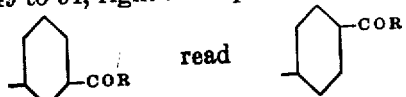 read column 5, lines 3 to 7, right-hand portion of the formula, for

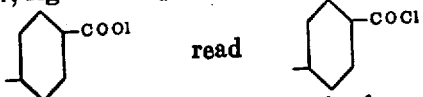 read column 7, lines 13 to 16, right-hand portion of the formula, for

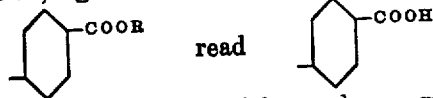 read and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*